Oct. 25, 1960
W. B. SHETTERLY ET AL
2,957,794
BONDING SILICONE RUBBER TO METAL
Filed Nov. 30, 1955
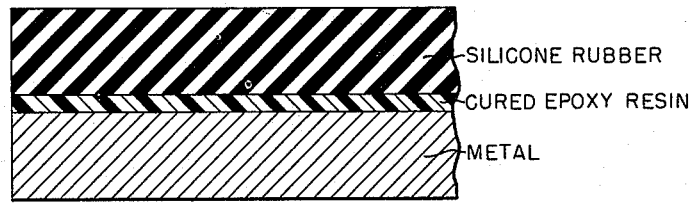
INVENTORS
WILLIAM B. SHETTERLY
JACK E. COWLING
BY
ATTORNEYS

United States Patent Office 2,957,794
Patented Oct. 25, 1960

2,957,794

BONDING SILICONE RUBBER TO METAL

William B. Shetterly, Manassas, and Jack E. Cowling, Alexandria, Va., assignors to the United States of America as represented by the Secretary of the Navy Filed Nov. 30, 1955, Ser. No. 550,225

5 Claims. (Cl. 154—130)

(Granted under Title 35, U.S. Code (1952), sec. 266)

The invention described herein may be manufactured and used by or for the Government of the United States of America for governmental purposes without the payment of any royalties thereon or therefor.

This invention relates to a method of bonding silicone rubber to metal and to the new bonded structures.

Silicone rubber has a number of valuable properties and is superior to organic rubber in thermal stability, low temperature flexibility and arc and corona resistance. It has good weathering characteristics and is indicated for use in place of organic rubber where heat or extreme cold or both are to be encountered. In a number of instances the valuable properties of silicone rubber are only to be put to use when the rubber is fixed to a metal support, such as in use as gaskets for bomb-bay doors and oven doors, as covering for rolls used in hot processing of materials, as an element of shock mounts, as radiation absorbing material and as corona resistant insulation for high tension wires. Silicone rubber, however, has poor adhesion for metals and bonding agents have heretofore been used for the purpose of fixing the rubber to the metal.

It is an object of the present invention to provide a method of producing a new bonding of silicone rubber to metals. It is a further object to provide new structures in which silicone rubber is bonded to metal. Other objects will appear from the description of the invention which follows:

We have found that silicone rubber can be effectively bonded to metal by affixing the two materials to one another by means of an epoxy resin adhesive containing an amine curing catalyst and a filler and subjecting the assembly to the action of heat to effect curing of the resin. In the curing step, the epoxy resin undergoes polymerization and reaction with the amine catalyst to form a cross-linked polymer or resin which bonds the silicone rubber to the metal.

The method of the invention is applicable to the bonding of silicone rubber to any of the metals, e.g., copper, brass, bronze, magnesium, aluminum, steel, etc., and can be practiced starting with semi-cured or cured silicone rubber. The bond between the adhesive and the metal is improved by a roughening of the metal surface as by abrading with fine sandpaper.

Any epoxy resin can be used for the adhesive in the method of the present invention, for example, the commercially available epoxy resins which are made by condensing epichlorohydrin with glycerol or with bis-phenol A, the latter being bis(p-hydroxyphenyl) dimethylmethane, $(p\text{-}HOC_6H_4)_2\text{—}C\text{—}(CH_3)_2$. A preferred epoxy resin for the bonding in accordance with the invention is that obtained by the condensation of epichlorohydrin with bis-phenol A.

Fillers which may be used in the adhesive for reinforcing are, for example, finely divided clay and mica, wood flour, etc. The proportion of the filler in the adhesive may be varied with resulting variation in the strength of the bond obtained between the silicone rubber and the metal. Good to excellent bonds can be obtained, for example, with an adhesive of bis-phenol A epoxy resin and finely divided clay (rubber grade) in the proportions by weight of 1 part resin to from about 0.8 to 0.95 part of the clay. As will be understood by those skilled in the art, the amount of the resin in the adhesive should be sufficient to wet all of the particles of the filler. Mixing of the resin and filler can be carried out in a paint mill. The paste obtained from the mixing is then diluted with a suitable volatile organic solvent for the resin, such as toluene or methylethyl ketone, and the amine catalyst mixed therewith to form the adhesive. The adhesive is thinned with the volatile organic solvent to consistencies suitable for brush or spray application.

Any of the known amine catalysts for the curing of epoxy resins may be used in the adhesive for bonding of the silicone rubber to the metal. Such amine catalysts are characterized by being strongly basic and possessing two or more primary amino groups. Polyalkylene-polyamines such as ethylene diamine, diethylene triamine and tetramethylene pentamine are suitable as catalysts for curing of the epoxy resin. The amount of the amine catalyst added to the epoxy resin may be varied and will depend upon the activity of the particular amine and the temperature of the curing, higher concentrations generally being required for low temperature curing. In general, the amount of the amine curing catalyst added to the epoxy resin will be from about 3 to 10% by weight and preferably is from about 4 to 8% by weight on the resin. The bonding material in the assembly of silicone rubber and metal can be modified with regard to flexibility and hardness by varying the amount of the amine catalyst and by the addition to the adhesive of allyl glycidyl ether in amounts up to about 25% by weight on the epoxy resin. Optimum properties in the bond will generally be obtained by using about 10% by weight allyl glycidyl ether with about 5% by weight of the amine catalyst on the epoxy resin.

The adhesive is applied as a thin film, on the order of about .001 inch, to the surface of the silicone rubber or of the metal or both, the parts adhered and the resulting assembly subjected to heat to effect curing of the resin and bonding together of the rubber and the metal.

Curing of the epoxy resin in the adhesive in the presence of the amine catalyst can take place over a relatively wide range of temperatures. Assemblies of silicone rubber and metal can be bonded at lower temperatures, e.g., room temperature, by the use of higher concentrations of the amine curing catalyst in the adhesive. Accelerated curing of the epoxy resin in the adhesive can be had at higher temperatures, with a recommended general higher temperature range therefor being from about 240° to 260° F. Within this recommended higher temperature range, bonding with an adhesive of, for example, bis-phenol A epoxy resin and filler can be had within a period of about one-quarter hour. The bond having been made at a temperature within the recommended higher range, further heating at the higher temperature used in completing the cure of semi-cured silicone rubber will generally serve to effect a more complete cure of the resin of the bond. The curing may be carried out in an oven (air cure) or in a pressurized mold, with an advantage in the case of molds of quicker heating of the assembly through transfer of heat from the metal walls of the mold. It is advisable to effect the bonding of the semi-cured silicone rubber to the metal within a reasonably short period of time after the pre-cure of the rubber, as standing of the semi-cured stock for prolonged periods of time, e.g., 5 to 6 days, has been found to result in bonds of inferior strength. Best results are to be obtained by effecting the bonding within a few hours after the initial cure of the silicone gum rubber.

Where the silicone rubber in the bonded assembly is semi-cured, the assembly is subjected to further heating at a higher temperature to complete the cure of the silicone rubber. This second curing step is conducted in accordance with customary practice for completing the cure of semi-cured silicone rubber.

Curing of silicone gum rubber is customarily carried out by a two step process in which the gum stock containing a peroxide vulcanizing agent, usually benzoyl peroxide, is heated in a pressurized mold for a short time at a temperature sufficient to decompose the peroxide, which temperature may be from about 220° to 240° F. The semi-cured silicone rubber from this first or pre-cure step is then brought to full cure by heating it in air at higher temperatures for a considerably longer period of time, for example, at a temperature of from about 300° F. to a maximum of about 480° F. over a period of from about 4 to 24 hours depending upon the thickness of the stock and the properties desired in the cured silicone rubber. This second step of the process is known as air-curing and is usually carried out in an air-circulating oven. Semi-cured silicone rubber is defined herein as silicone gum rubber which has been partially cured to the extent that completion of the cure of the same can be accomplished by subjecting it to air-curing.

In the accompanying drawing forming part of the description of the present invention there is shown by way of illustration, in section and partly broken away, one form of bonded article or structure in accordance with the invention. As shown in the single figure, a strip of silicone rubber is bonded to a strip of metal by means of a layer of epoxy resin which has been cured in the presence of an amine curing catalyst therefor. The showing is made in exaggerated thickness for the purpose of more clearly illustrating the presence of the bonding layer between the silicone rubber and the metal.

The surface of the metal should be in clean condition, free from oils and grease, before application of the epoxy resin adhesive. Cleaning of the metal and removal of oxide coating can be accomplished by lightly sanding with a very fine grit of sand, carborundum or metal, followed by washing with a volatile hydrocarbon grease solvent such as non-leaded gasoline. Wet cleaning with very fine grit, such as scouring powder mixed with a commercial synthetic detergent may be used for preparing brass and copper surfaces, the grit and detergent being removed by washing with water and the surface then dried in the air or with a water-miscible solvent such as acetone or methylethyl ketone. The silicone rubber should also be in clean condition before bonding. In the case of magnesium, improved adhesion of the resin to the metal can be obtained by pretreating the magnesium surface with chromic acid or a mixture of sodium dichromate and nitric acid to induce a complex oxide-chromate formation thereon. Aluminum is anodized to improve adhesion of the resin to the metal.

The invention is further illustrated by the following specific examples of the bonding of silicone rubber to metal. Parts are by weight.

*Example 1*

Silicone gum rubber (dimethyl polymer) was compounded with fine silica (rubber grade) and with a paste of benzoyl peroxide in tricresyl phosphate (50% benzoyl peroxide) in the proportions of 100 parts of the gum polymer, 40 parts of the fine silica and 4 parts of the benzoyl peroxide paste. The compounded gum stock was press cured at 230° F. for 15 minutes to yield semi-cured silicone rubber in strips of approximately one-eighth inch thickness.

The adhesive was prepared from bis (p-hydroxyphenyl) dimethylmethane (bis-phenol A) epoxy resin and fine clay (rubber grade) in the proportions of 52 parts of the resin to 48 parts of the fine clay, the materials being mixed in a paint mill to form a thick paste. The paste was diluted with methylethyl ketone and mixed with 8 parts of diethylene triamine to form the adhesive.

Brass panels were scrubbed with water and a mixture of a synthetic detergent (Tide) and fine scouring powder (Bon Ami), rinsed with water and roughened with sandpaper (3–0). The panels were again scrubbed as before, rinsed with water and allowed to dry in the air.

The adhesive was thinned with methylethyl ketone to spraying viscosity and sprayed onto the surface of the cleaned brass panels to form an approximately .001 inch coating thereon. The coated panels were dried by standing in the air to effect evaporation of the solvent. A strip of the semi-cured silicone rubber was then pressed onto each of the adhesive coated brass panels and the assemblies subjected in a pressure mold to heating for 15 minutes at 240° F., 250° F., and 260° F., respectively. Strip testing of the bonded assemblies showed excellent adhesion for the parts in the assembly heated at 240° F. and 250° F., respectively, and good adhesion for the parts in the assembly heated at 260° F.

*Example 2*

Assemblies of semi-cured silicone rubber with respectively brass, copper, cold rolled steel and anodized aluminum were prepared as in Example 1 with the exception that the temperature of the press cure was 245° F. Excellent adhesion was obtained for the parts in each of the bonded assemblies.

The fully cured condition is had by heating the assembly at 300° F. in an air-circulating oven for a period of about 4 hours in accordance with the known procedure for completing the cure of semi-cured silicone rubber.

The production of bonded assemblies in which cured instead of semi-cured silicone rubber is used with the metal can be had following the procedure of the preceding examples.

Since the invention may be variously practiced without departing from the spirit or scope thereof, it is intended that specific embodiments of the invention appearing in the above description shall be taken as illustrative rather than in limitation except as may be required by the following claims.

What is claimed is:

1. A method of bonding silicone rubber to metal which comprises directly affixing semi-cured silicone rubber to the metal with a thin film of a fluid adhesive comprising an epoxy resin, a filler and an amine curing catalyst for the resin, subjecting the resulting assembly to heat sufficient to cure the resin and effect bonding of the semi-cured silicone rubber to the metal and then heating the assembly in air at a temperature in the range of from about 300 to 480° F. for a time sufficient to complete the cure of the semi-cured silicone rubber in the assembly.

2. A method of bonding silicone rubber to metal which comprises directly affixing semi-cured silicone rubber to the metal with a thin film of a fluid adhesive comprising bis(p-hydroxyphenyl) dimethylmethane epoxy resin, a filler and an amine curing catalyst for the resin, subjecting the resulting assembly to heat sufficient to cure the resin and effect bonding of the semi-cured silicone rubber to the metal and then heating the assembly in air at a temperature in the range of from about 300 to 480° F. for a time sufficient to complete the cure of the semi-cured silicone rubber in the assembly.

3. A method of bonding silicone rubber to a copper-containing metal which comprises coating a surface of the copper-containing metal with a thin film of a fluid adhesive comprising an epoxy resin, a filler and an amine curing catalyst for the resin, adhering semi-cured silicone rubber to said adhesive film on the copper-containing metal, subjecting the resulting assembly to heat sufficient to cure the resin and effect bonding of the semi-cured rubber to the copper-containing metal and then heating the assembly in air at a temperature in the range of from about 300 to 480° F. for a time sufficient to complete the cure of the semi-cured silicone rubber in the assembly.

4. A method of bonding silicone rubber to a copper-containing metal as defined in claim 3, wherein the copper-containing metal is brass.

5. A method of bonding silicone rubber to anodized aluminum which comprises coating a surface of the anodized aluminum with a thin film of a fluid adhesive comprising an epoxy resin, a filler and an amine curing catalyst for the resin, adhering semi-cured silicone rubber to said adhesive film on the anodized aluminum, subjecting the resulting assembly to heat sufficient to cure the resin and effect bonding of the semi-cured silicone rubber to the anodized aluminum and then heating the assembly in air at a temperature in the range of from about 300 to 480° F. for a time sufficient to complete the cure of the semi-cured silicone rubber in the assembly.

References Cited in the file of this patent

UNITED STATES PATENTS

| | | |
|---|---|---|
| 2,467,853 | Poskitt et al. | Apr. 19, 1949 |
| 2,575,558 | Newey et al. | Nov. 20, 1951 |
| 2,585,115 | Greenlee | Feb. 12, 1952 |
| 2,601,337 | Smith-Johannsen | June 24, 1952 |
| 2,639,276 | Smith-Johannsen et al. | May 19, 1953 |
| 2,682,515 | Naps | June 29, 1954 |
| 2,699,402 | Meyer | Jan. 11, 1955 |
| 2,706,166 | Gurney | Apr. 12, 1955 |